US012571436B2

(12) United States Patent
Lee et al.

(10) Patent No.: US 12,571,436 B2
(45) Date of Patent: Mar. 10, 2026

(54) DIFFERENTIAL DISCONNECT SYSTEM

(71) Applicant: Schaeffler Technologies AG & Co. KG, Herzogenaurach (DE)

(72) Inventors: Brian Lee, Charlotte, NC (US); Michael Hodge, Wadsworth, OH (US); Carsten Behler, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/045,618

(22) Filed: Feb. 5, 2025

(65) Prior Publication Data

US 2026/0022741 A1      Jan. 22, 2026

Related U.S. Application Data

(60) Provisional application No. 63/673,990, filed on Jul. 22, 2024.

(51) Int. Cl.
F16D 27/118        (2006.01)
F16D 27/14        (2006.01)
(52) U.S. Cl.
CPC ............ F16D 27/118 (2013.01); F16D 27/14 (2013.01)

(58) Field of Classification Search
CPC ......... F16D 27/118; F16D 27/14; F16D 27/09
See application file for complete search history.

(56) References Cited

U.S. PATENT DOCUMENTS

| | | | | |
|---|---|---|---|---|
| 2011/0105264 A1* | 5/2011 | Maruyama | .............. | F16D 27/09 |
| | | | | 192/66.1 |
| 2017/0297428 A1* | 10/2017 | Inose | .................... | F16D 27/112 |
| 2019/0178359 A1* | 6/2019 | Komatsu | ................. | F16H 48/42 |
| 2022/0349460 A1* | 11/2022 | Yu | ........................... | F16H 48/24 |
| 2023/0143681 A1 | 5/2023 | Cao et al. | | |

* cited by examiner

*Primary Examiner* — Timothy Hannon

(57)        ABSTRACT

A differential disconnect system includes an outer differential housing, an inner differential housing, a clutch plate arranged axially adjacent to the inner differential housing, a clutch spring, and an electromagnet. The outer differential housing has a first plurality of radial notches, the inner differential housing has a first plurality of axial teeth, and the clutch plate has a first plurality of radial tabs engaged with the first plurality of radial notches and a second plurality of axial teeth arranged to selectively engage the first plurality of axial teeth. The clutch spring is arranged to urge the clutch plate towards the inner differential housing to engage the second plurality of axial teeth with the first plurality of axial teeth. The clutch plate is urged away from the inner differential housing to disengage the second plurality of axial teeth from the first plurality of axial teeth when the electromagnet is energized.

18 Claims, 5 Drawing Sheets

DIFFERENTIAL DISCONNECT SYSTEM

CROSS-REFERENCE TO RELATED APPLICATIONS

This application claims the benefit of U.S. Provisional Patent Application No. 63/673,990, filed Jul. 22, 2024, the disclosure of which is incorporated in its entirety by reference herein.

TECHNICAL FIELD

The present disclosure relates generally to a vehicle differential, and more specifically to a differential disconnect system.

BACKGROUND

Differential disconnect mechanisms are known. One example is shown and described in United States Patent Application Publication No. 2023/0143681 titled DIFFERENTIAL SYSTEM to Cat et al.

SUMMARY

A differential disconnect system includes a rotational axis, an outer differential housing, an inner differential housing arranged radially inside of the outer differential housing, a clutch plate arranged radially inside of the outer differential housing and axially adjacent to the inner differential housing, a clutch spring, and an electromagnet. The outer differential housing has a first plurality of radial notches, the inner differential housing has a first plurality of axial teeth, and the clutch plate has a first plurality of radial tabs engaged with the first plurality of radial notches and a second plurality of axial teeth arranged to selectively engage the first plurality of axial teeth. The clutch spring is arranged to urge the clutch plate towards the inner differential housing to engage the second plurality of axial teeth with the first plurality of axial teeth. The clutch plate is urged away from the inner differential housing to disengage the second plurality of axial teeth from the first plurality of axial teeth when the electromagnet is energized.

In an example embodiment, the clutch spring is a wave spring and the clutch plate has a circumferential notch for receiving the wave spring. In an example embodiment, the differential disconnect system also includes a first guide bushing. The inner differential housing is rotatably mounted in the outer differential housing by the first guide bushing. In some example embodiments, the outer differential housing has a tubular portion and the electromagnet is rotatably arranged on the tubular portion. In an example embodiment, the differential disconnect system also includes a first retaining ring for axially securing the electromagnet on the tubular portion.

In some example embodiments, the differential disconnect system also includes an armature and a finger plate. The armature is axially movable towards the electromagnet when the electromagnet is energized, and the finger plate is secured in the armature and arranged to move the clutch plate away from the inner differential housing when the electromagnet is energized. In an example embodiment, the armature has a "C" shape in cross-section. In some example embodiments, the outer differential housing has a plurality of apertures, and the finger plate has a plurality of fingers, each extending through one of the plurality of apertures to engage the clutch plate. In an example embodiment, the clutch plate has a plurality of radial notches, and each of the plurality of fingers comprises a hook portion secured in one of the plurality of radial notches.

In some example embodiments, the armature has a circumferential groove, and the finger plate is secured in the circumferential groove. In some example embodiments, the differential disconnect system also includes a bearing disposed in the circumferential groove and arranged to rotatably secure the finger plate in the circumferential groove. In some example embodiments, the circumferential groove has a radial wall, and the finger plate has an annular portion secured between the radial wall and the bearing. In an example embodiment, the differential disconnect system also includes a second retaining ring axially securing the bearing in the circumferential groove, and a washer arranged axially between the second retaining ring and the bearing.

In some example embodiments, the differential disconnect system also includes a gear set disposed in the inner differential housing. In some example embodiments, the differential disconnect system also includes an inner differential cover secured to the inner differential housing for securing the gear set in the inner differential housing. In some example embodiments, the differential disconnect system also includes an outer differential cover, secured to the outer differential housing for securing the inner differential housing in the outer differential housing. In an example embodiment, the differential disconnect system also includes a second guide bushing, and the inner differential cover is rotatably mounted in the outer differential cover by the second guide bushing. In an example embodiment, the differential disconnect system also includes a drive gear, and the outer differential housing is secured to the drive gear.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
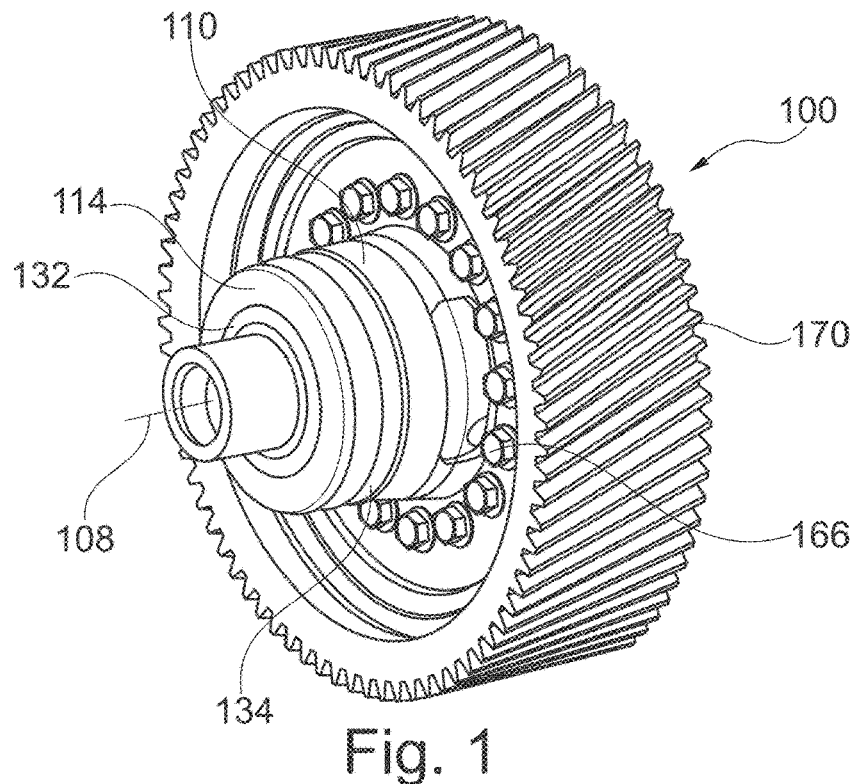
FIG. 1 illustrates a perspective view of a differential disconnect system according to an example embodiment.
Figure 2:
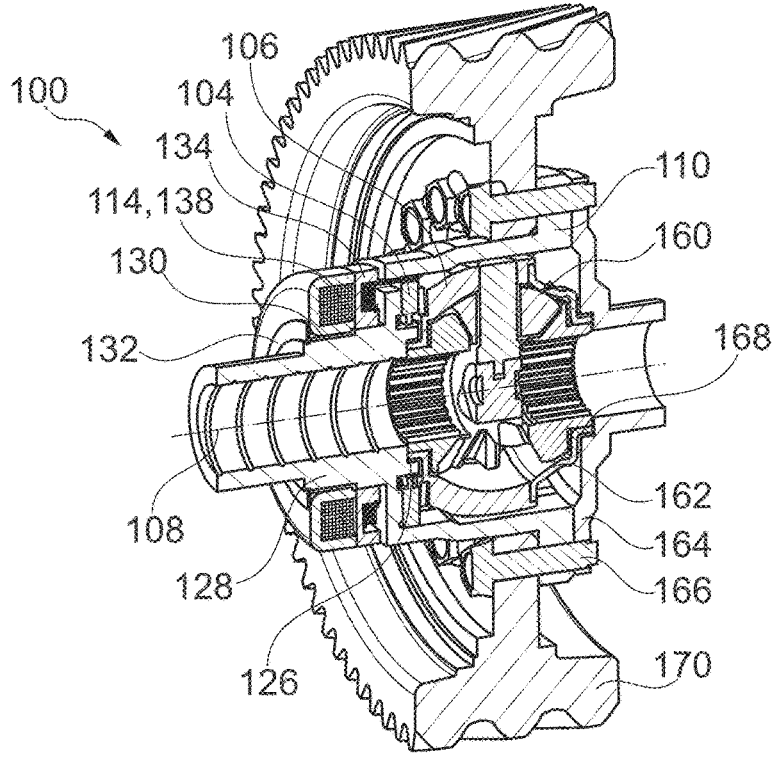
FIG. 2 illustrates a perspective cross-sectional view of the differential disconnect system of FIG. 1.
Figure 3:
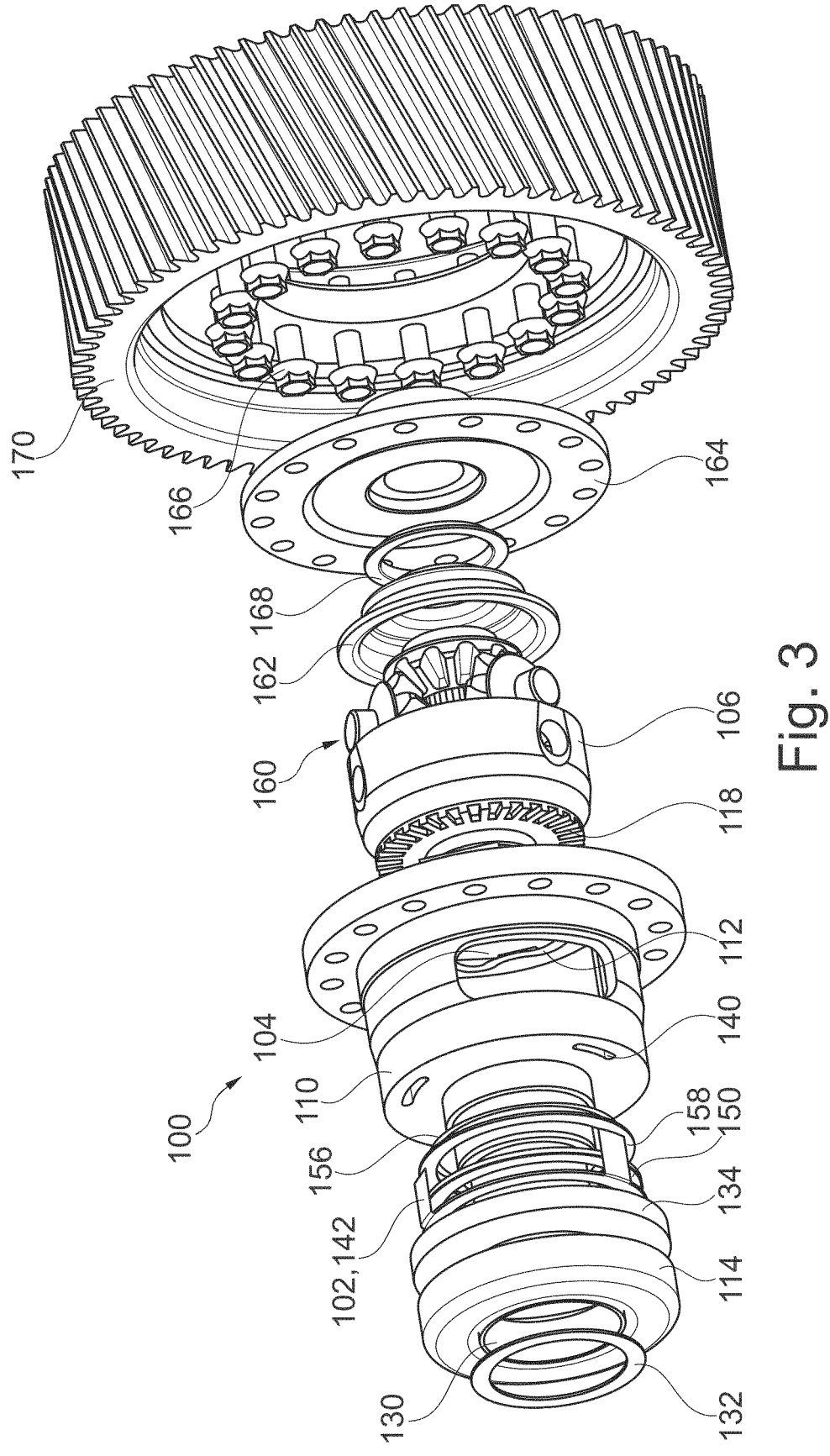
FIG. 3 illustrates a perspective exploded view of the differential disconnect system of FIG. 1.
Figure 4:
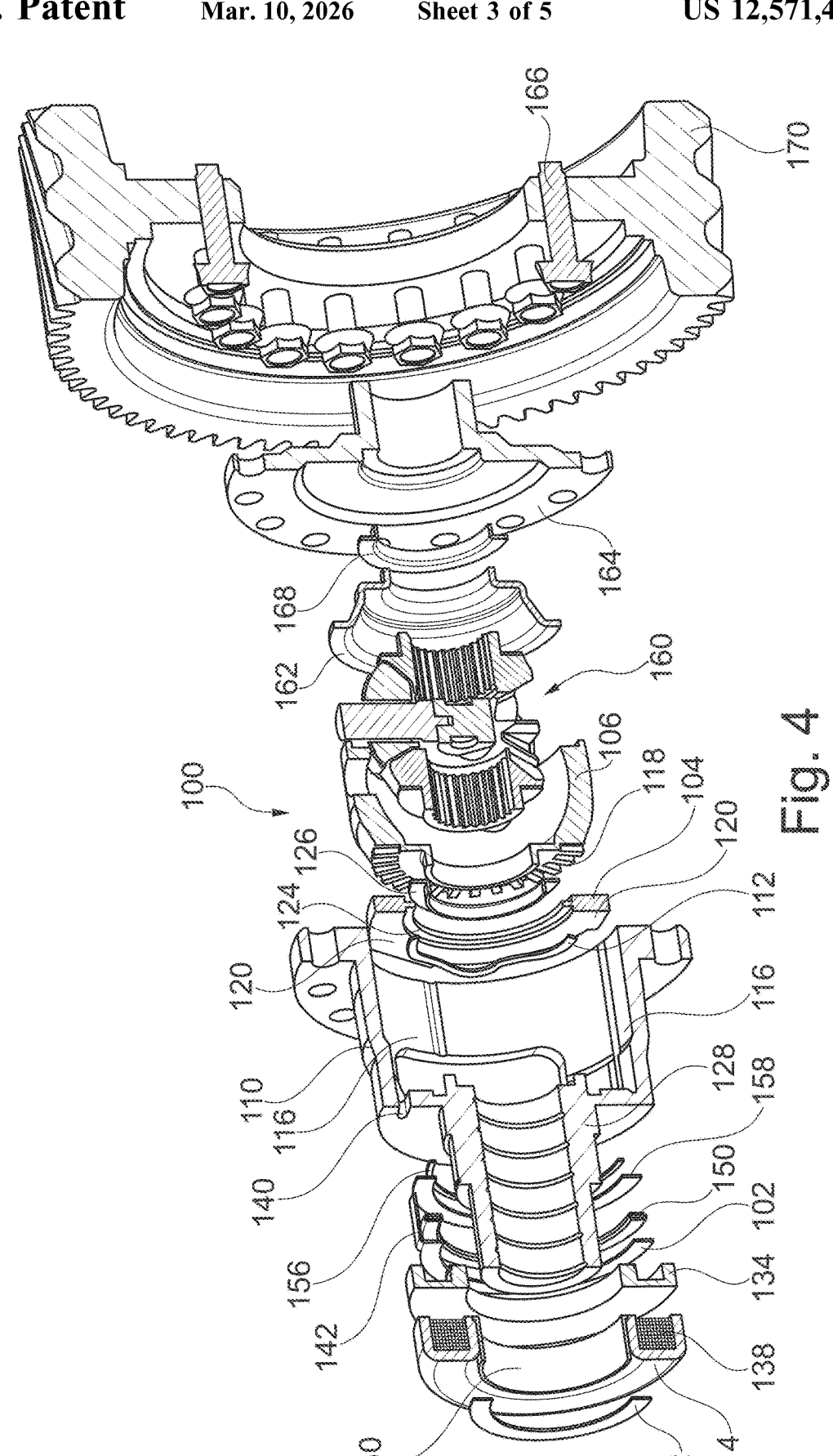
FIG. 4 illustrates a cross-sectional view of the perspective exploded view of FIG. 3.
Figure 5:
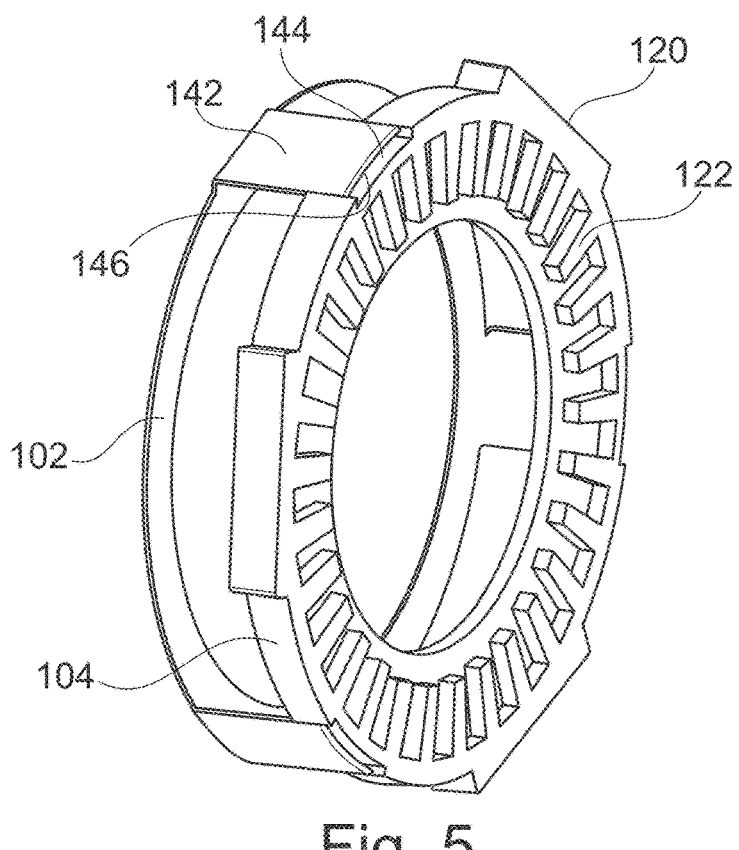
FIG. 5 illustrates a perspective view of a finger plate engaged with a clutch plate.
Figure 6:
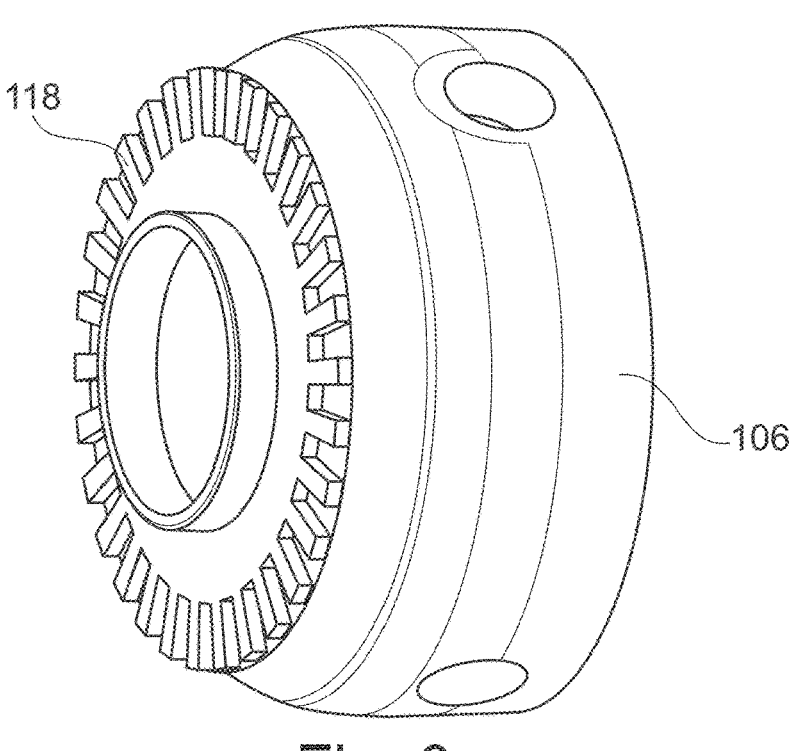
FIG. 6 illustrates a perspective view of an inner differential housing.

The following description is made with reference to FIGS. 1-6. FIG. 1 illustrates a perspective view of differential disconnect system 100. FIG. 2 illustrates a perspective cross-sectional view of differential disconnect system 100 of FIG. 1. FIG. 3 illustrates a perspective exploded view of differential disconnect system 100 of FIG. 1. FIG. 4 illustrates a cross-sectional view of the perspective exploded view of FIG. 3. FIG. 5 illustrates a perspective view of finger plate 102 engaged with clutch plate 104. FIG. 6 illustrates a perspective view of inner differential housing 106.

Differential disconnect system 100 includes rotational axis 108, outer differential housing 110, inner differential housing 106 arranged radially inside of the outer differential housing, clutch plate 104, clutch spring 112, and electromagnet 114. Outer differential housing 110 includes radial notches 116 and inner differential housing 106 includes axial teeth 118. Clutch plate 104 is arranged radially inside of the outer differential housing and axially adjacent to the inner differential housing. Clutch plate 104 includes radial tabs 120 engaged with radial notches 116, and axial teeth 122 arranged to selectively engage axial teeth 118. Clutch spring 112 is arranged to urge the clutch plate towards the inner differential housing to engage axial teeth 122 with axial teeth 118 as described in more detail below. The clutch plate is urged away from the inner differential housing to disengage axial teeth 122 from axial teeth 118 when the electromagnet is energized as described in more detail below.

In the embodiment shown, clutch spring 112 is a wave spring and clutch plate 104 includes circumferential notch 124 for receiving the wave spring. Differential disconnect system 100 also includes guide bushing 126 and the inner differential housing is rotatably mounted in the outer differential housing by guide bushing 126. As shown in the figures, guide bushing 126 includes a cylindrical portion providing rotational support and an annular portion providing axial support between the inner differential housing and the outer differential housing. In other words, bushing 126 allows the inner differential housing to rotate relative to the outer differential housing with reduced friction.

Outer differential housing 110 includes tubular portion 128 and electromagnet 114 is rotatably arranged on the tubular portion. That is, electromagnet 114 may include rotational bushing 130 for reduced friction between the electromagnet and the outer differential housing. The electromagnet may be securely mounted in an axle housing (not shown) and rotationally fixed, and the rotational bushing allows rotation of the outer differential housing inside of the electromagnet with reduced friction. Differential disconnect system 100 also includes retaining ring 132 for axially securing the electromagnet on the tubular portion.

Figures 7, 8:
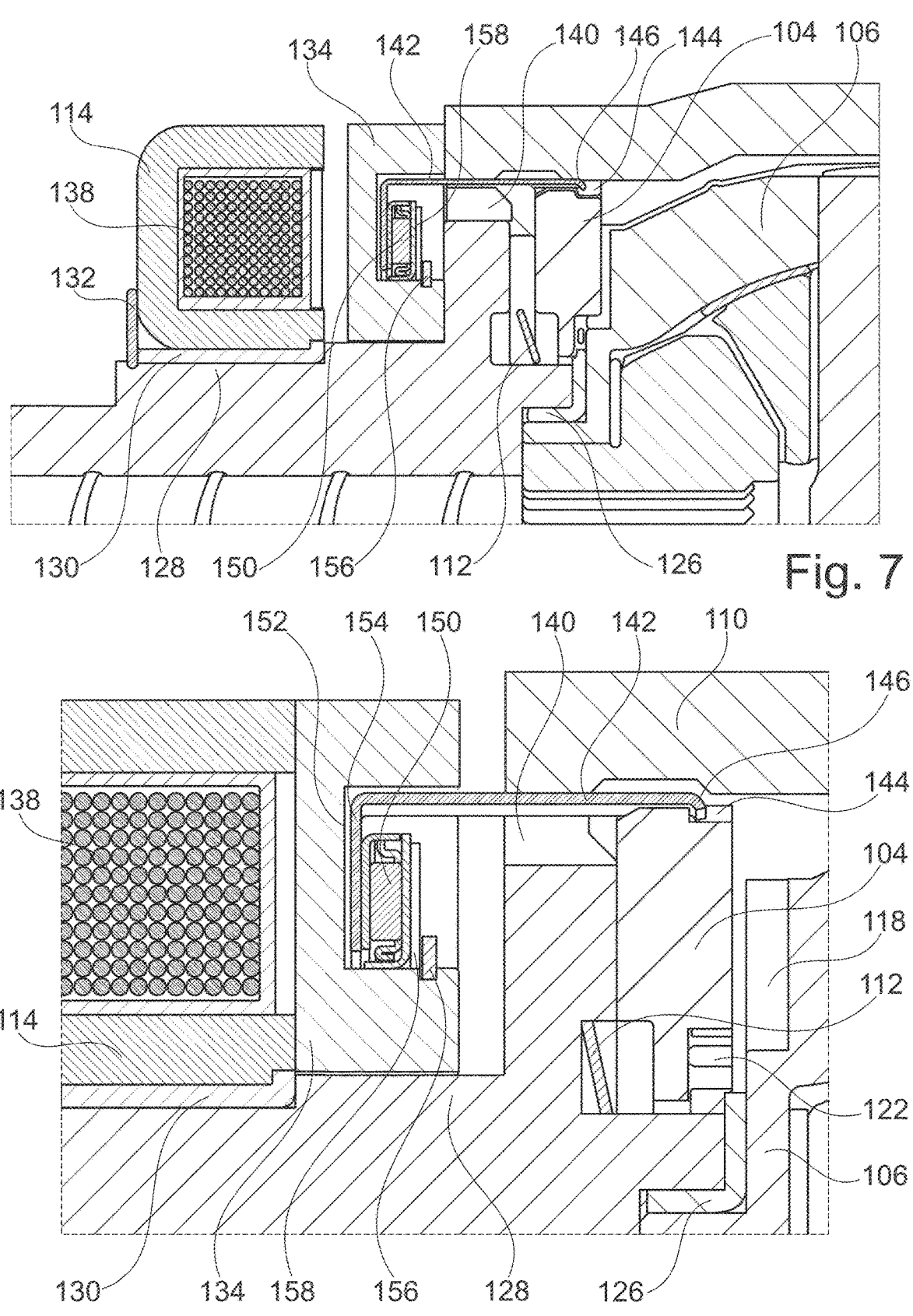
FIG. 7 illustrates a detail cross-sectional view of the differential disconnect system of FIG. 1 shown in a locked position.
FIG. 8 illustrates a detail cross-sectional view of the differential disconnect system of FIG. 1 shown in an unlocked position.

The following description is made with reference to FIGS. 1-8. FIG. 7 illustrates a detail cross-sectional view of differential disconnect system 100 of FIG. 1 shown in a locked position. FIG. 8 illustrates a detail cross-sectional view of differential disconnect system 100 of FIG. 1 shown in an unlocked position. Differential disconnect system 100 also includes armature 134, axially movable towards the electromagnet when the electromagnet is energized, and finger plate 102, secured in the armature and arranged to move the clutch plate away from the inner differential housing when the electromagnet is energized. That is, the electromagnet includes coil 138 that, when energized, magnetically pulls the armature towards the electromagnet in a known manner. As can be seen best in FIGS. 7-8, for example, the armature has a "C" shape in cross-section.

Outer differential housing includes apertures 140 and finger plate 102 includes fingers 142 extending apertures 140 to engage the clutch plate. Clutch plate 104 includes radial notches 144 and fingers 142 include hook portions 146 secured in the radial notches. Hook portions 146 allow the finger plate to pully the clutch plate away from the inner differential housing to compress clutch spring 112 and disengage axial teeth 122 from axial teeth 118.

Armature 134 includes circumferential groove 148 and finger plate 102 is secured in the circumferential groove as described below. Differential disconnect system 100 also includes bearing 150 disposed in the circumferential groove and arranged to rotatably secure the finger plate in the circumferential groove. That is, the circumferential groove includes radial wall 152 and the finger plate includes annular portion 154 secured between the radial wall and the bearing. Bearing 150 is shown as an axial roller bearing that allows low friction rotation of finger plate 102 with clutch plate 104 when the armature is stationary. Differential disconnect system 100 also includes retaining ring 156 axially securing the bearing in the circumferential groove, and washer 158 arranged axially between retaining ring 156 and the bearing.

Differential disconnect system 100 also includes gear set 160 disposed in the inner differential housing. Although a bevel gear set is shown, other differential gear sets are possible. For example, gear set 160 may be a limited slip gear arrangement such as a clutch type or a Torsen differential gear set. Differential disconnect system 100 also includes inner differential cover 162 secured to the inner differential housing for securing the gear set in the inner differential housing.

Differential disconnect system 100 also includes outer differential cover 164, secured to the outer differential housing via bolts 166, for example, for securing the inner differential housing in the outer differential housing. Differential disconnect system 100 also includes guide bushing 168. The inner differential cover is rotatably mounted in the outer differential cover by guide bushing 168, similar to mounting of inner differential housing 106 on outer differential housing 110 by guide bushing 126 described above. Differential disconnect system 100 also includes drive gear 170, and the outer differential housing is secured to the drive gear via bolts 166, for example.

Operation of the differential disconnect system will now be discussed. During normal driving operation (as shown in FIG. 7, for example, clutch spring 112 moves clutch plate 104 to the right, engaging axial teeth 122 with axial teeth 118 of the inner differential housing. Radial tabs 120, engaged with radial notches 116, transmit torque from the outer differential housing to the clutch plate. Thus, torque is transmitted from drive gear 170 through bolts 166, outer differential housing 110, clutch plate 104 and inner differential housing 106 to gear set 160 to propel a vehicle in a known manner. Bearing 150 allows rotation of fingers 142 extending through apertures 140 and engaged with clutch plate 104 with reduced friction relative to non-rotating armature 134.

When it is desirable to disconnect the drive gear from the gear set, electromagnet 114 is energized and armature 134, attracted by magnetic coil 138, moves to the left as shown in FIG. 8. Armature 134 moves retaining ring 156 to the left, pulling washer 158, bearing 150 and finger plate 102 to the left as well. Hook portions 146 on fingers 142 are engaged in radial notches 144 of the clutch plate, and pull the clutch plate to the left, compressing clutch spring 112 and disengaging axial teeth 122 from axial teeth 118. Thus, no torque is transferred from the outer differential housing to the inner differential housing, and the drive gear and gear set are disconnected. Guide bushings 126 and 168 allow relative rotation of the outer differential housing and outer differential cover relative to the inner differential housing and the inner differential cover, respectively, with reduced friction.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Differential disconnect system
102 Finger plate
104 Clutch plate
106 Inner differential housing
108 Rotational axis
110 Outer differential housing
112 Clutch spring
114 Electromagnet
116 Radial notches (first, outer differential housing)
118 Axial teeth (first, inner differential housing)
120 Radial tabs (first, clutch plate)
122 Axial teeth (second, clutch plate)
124 Circumferential notch
126 Guide bushing (first)

6

128 Tubular portion (outer differential housing)
130 Rotational bushing (electromagnet)
132 Retaining ring (first, electromagnet to tubular portion)
134 Armature
138 Coil (electromagnet)
140 Apertures (outer differential housing)
142 Fingers (finger plate)
144 Radial notches (clutch plate)
146 Hook portions (fingers)
148 Circumferential groove (armature)
150 Bearing
152 Radial wall (armature)
154 Annular portion (finger plate)
156 Retaining ring (second, bearing to armature)
158 Washer
160 Gear set
162 Inner differential cover
164 Outer differential cover
166 Bolts
168 Guide bushing (second)
170 Drive gear

What is claimed is:

1. A differential disconnect system, comprising:
a rotational axis;
an outer differential housing comprising a first plurality of radial notches;
an inner differential housing arranged radially inside of the outer differential housing and comprising a first plurality of axial teeth;
a clutch plate arranged radially inside of the outer differential housing and axially adjacent to the inner differential housing, the clutch plate comprising:
a first plurality of radial tabs engaged with the first plurality of radial notches; and
a second plurality of axial teeth arranged to selectively engage the first plurality of axial teeth;
a clutch spring arranged to urge the clutch plate towards the inner differential housing to engage the second plurality of axial teeth with the first plurality of axial teeth; and
an electromagnet, wherein the clutch plate is urged away from the inner differential housing to disengage the second plurality of axial teeth from the first plurality of axial teeth when the electromagnet is energized.

2. The differential disconnect system of claim 1, wherein:
the clutch spring is a wave spring; and
the clutch plate comprises a circumferential notch for receiving the wave spring.

3. The differential disconnect system of claim 1, further comprising a first guide bushing, wherein the inner differential housing is rotatably mounted in the outer differential housing by the first guide bushing.

4. The differential disconnect system of claim 1, wherein:
the outer differential housing comprises a tubular portion; and
the electromagnet is rotatably arranged on the tubular portion.

5. The differential disconnect system of claim 4, further comprising a first retaining ring for axially securing the electromagnet on the tubular portion.

6. The differential disconnect system of claim 1, further comprising:
an armature, axially movable towards the electromagnet when the electromagnet is energized; and a finger plate, secured in the armature and arranged to move the clutch plate away from the inner differential housing when the electromagnet is energized.

7. The differential disconnect system of claim 6, wherein the armature has a "C" shape in cross-section.

8. The differential disconnect system of claim 6, wherein:

the outer differential housing comprises a plurality of apertures; and the finger plate comprises a plurality of fingers, each extending through one of the plurality of apertures to engage the clutch plate.

9. The differential disconnect system of claim 8, wherein:

the clutch plate comprises a plurality of radial notches; and each of the plurality of fingers comprises a hook portion secured in one of the plurality of radial notches.

10. The differential disconnect system of claim 6, wherein:

the armature comprises a circumferential groove; and the finger plate is secured in the circumferential groove.

11. The differential disconnect system of claim 10 further comprising a bearing disposed in the circumferential groove and arranged to rotatably secure the finger plate in the circumferential groove.

12. The differential disconnect system of claim 11, wherein:

the circumferential groove comprises a radial wall; and the finger plate comprises an annular portion secured between the radial wall and the bearing.

13. The differential disconnect system of claim 12 further comprising:

a second retaining ring axially securing the bearing in the circumferential groove; and a washer arranged axially between the second retaining ring and the bearing.

14. The differential disconnect system of claim 1 further comprising a gear set disposed in the inner differential housing.

15. The differential disconnect system of claim 14 further comprising an inner differential cover secured to the inner differential housing for securing the gear set in the inner differential housing.

16. The differential disconnect system of claim 15 further comprising an outer differential cover, secured to the outer differential housing for securing the inner differential housing in the outer differential housing.

17. The differential disconnect system of claim 16 further comprising a second guide bushing, wherein the inner differential cover is rotatably mounted in the outer differential cover by the second guide bushing.

18. The differential disconnect system of claim 1 further comprising a drive gear, wherein the outer differential housing is secured to the drive gear.

* * * * *